United States Patent [19]

Tatsuta et al.

[11] 3,892,573
[45] July 1, 1975

[54] METHOD OF IMPROVING THE SURFACE OF A HIGH MOLECULAR WEIGHT SUPPORT

[75] Inventors: Sumitaka Tatsuta; Wataru Ueno, both of Minami-Ashigara, Japan

[73] Assignee: Fuji Photo Film Co., Ltd., Minami-Ashigara, Japan

[22] Filed: Dec. 22, 1971

[21] Appl. No.: 211,058

[30] Foreign Application Priority Data
Dec. 24, 1970  Japan.............................. 45-11808

[52] U.S. Cl. ..................... 96/67; 204/159; 427/54; 427/57; 427/40
[51] Int. Cl. .......................... B44d 5/02; B44d 5/04
[58] Field of Search............ 117/138.8 F, 138.8 UA, 117/145, 62, DIG. 8, 47 R, 47 A

[56] References Cited
UNITED STATES PATENTS

| | | | |
|---|---|---|---|
| 2,657,668 | 11/1953 | Maier............................. | 117/DIG. 8 |
| 2,872,318 | 2/1959 | Starck........................... | 117/138.8 X |
| 3,053,661 | 9/1962 | Starck et al................... | 117/138.8 X |
| 3,098,370 | 7/1963 | Poole et al..................... | 117/DIG. 8 |
| 3,101,275 | 8/1963 | Cairns et al.................... | 117/47 R |
| 3,403,116 | 9/1968 | Ream et al..................... | 117/138.8 X |
| 3,454,424 | 7/1969 | Schneider....................... | 117/145 |
| 3,515,567 | 6/1970 | Tani et al....................... | 117/47 X |
| 3,704,154 | 11/1972 | Tatsuta et al................... | 117/47 A |
| 3,704,162 | 11/1972 | Oshibuchi et al................ | 117/138.8 X |

OTHER PUBLICATIONS
Wagner, Def. Pub. of Serial No. 513,120 filed 12/10/65, 862 O.G. 1009, May 27, 1969, (782,001).

*Primary Examiner*—William D. Martin
*Assistant Examiner*—Sadie L. Childs
*Attorney, Agent, or Firm*—Sughrue, Rothwell, Mion, Zinn & Macpeak

[57] ABSTRACT

A roughened surface of a high molecular weight support is remarkably improved in the receptivity and retentivity for inks, paints and adhesives by contacting the surface with a liquid in which hydrophilic resin is dissolved or dispersed while subjecting the liquid to ultrasonic vibrations.

16 Claims, No Drawings

METHOD OF IMPROVING THE SURFACE OF A HIGH MOLECULAR WEIGHT SUPPORT

BACKGROUND OF THE INVENTION

1. Field of the Invention

The present invention relates to the improvement of the surface of a support made of a hydrophobic high molecular weight substance.

2. Description of the Prior Art

Heretofore, papers made from pulp have been widely used as photographic printing papers, diffusion transfer photographic papers, printing papers, packaging papers and the like. In the case of photographic papers, for instance, baryta paper, prepared by coating an aqueous mixture containing fine particles of barium sulfate and a small quantity of a binder such as gelatin is usually employed for that purpose. Such a support, however, suffers various defects including expansion and contraction due to moisture variation, especially shrinkage brought about after development, a long period of drying time after development is required and the paper has poor resistance to water. In addition, general printed articles, packaging papers, posters and stickers are so weak in water resistance that they can not be exhibited outside, nor can they be used at a place where they are brought into contact with water.

As one method for overcoming the above defects, a support made of so-called "synthetic paper" which is obtained by whitening and opalizing a hydrophobic high molecular weight film has been used. However, since such a synthetic paper support has a poor affinity to hydrophilic resins such as gelatin which constitute a major component of a photographic coating emulsion, aqueous inks, aqueous paints, adhesives etc, it can not be directly used as a practical product without special treatments.

SUMMARY OF THE INVENTION

We, the inventors, after many efforts to overcome the above problems have discovered an improved and effective method for imparting good adhesion to the surface of a roughened hydrophobic high molecular weight support.

The object of this invention is to provide an improved method whereby a photographic coating layer containing gelatin or other natural or synthetic hydrophilic organic colloidal binders can be firmly adhered to a roughened and whitened support base made of a high molecular weight substance while improving the receptivity and retentivity for inks, paints and adhesives.

By the term "roughened surface" is meant a surface of a support having numerous fine opened pores. The construction the diameter and the depth of the pores vary with the polymer used as a support, since the formation of the pores is accomplished by the action of chemicals. Preferably the diameter is within the range of 0.1 to 100 microns and the depth is at least 0.1 micron. The depth may be increased to such an extent that the strength of the support can be retained.

The process of this invention comprises immersing a hydrophobic high molecular support having a roughened surface in a liquid in which a hydrophilic resin is dissolved or dispersed either in water or an organic solvent, while applying ultrasonic waves to the liquid and then evaporating water or the organic solvent from the resulting support. The thus treated high molecular weight support has a greatly improved affinity to water and, in particular, remarkably improved adhesion for a photographic coating layer containing gelatin as a binder and to adhesives.

DETAILED DESCRIPTION OF THE INVENTION

The high molecular weight support to be used in this invention includes, as typical examples, polystyrene, polyesters, polyolefins, polyamides, polycarbonates, polyvinyl chloride, cellulose acetate resins, polyacetals etc. The polymerization degree is not restrictive, but preferably varies from 100 to 5,000.

The roughening of the surface of the support may be effected in a variety of ways, for example, by contacting the support with an organic solvent capable of dissolving or swelling the support resin to thereby swell the film, then contacting the swollen resin with water or another organic solvent incapable of dissolving the support resin but having miscibility with the organic solvent used in the preceding swelling treatment to thereby create a roughened surface on the support. There may be also used other treatments than the organic solvent treatment for example, mechanical abrasion, the addition of a foaming agent capable of generating gas upon heating to thereby cause whitening all over the support, or selectively dissolving a foreign substance which has been admixed into the resin structure before molding to thereby form a roughened surface. Any one of the above roughening treatments as well as other treatments as well known to the art may be employed, without making a substantial difference in the value of the present invention, so long as a layer with fine projections or fine opened pores is formed on the surface of support.

The resin of the support may contain, in admixture therewith, titanium dioxide, barium sulfate, calcium sulfate, barium carbonate, lithopon, alumina white, calcium carbonate, silica white and similar white pigments in a non-limited amount. Colored pigments may be admixed therewith as well, if desired. The whitening or opalizing of the support according to such a method will give a unique appearance to the material manufactured using such a resin support without impairing the advantageous effect of this invention.

According to the present invention, the roughened surface of such a hydrophobic support is brought into contact with a solution or dispersion of a hydrophilic resin which is being vibrated by ultrasonic energy, whereby the hydrophilic resin is firmly captured or deposited onto the fine protrusions or inside the fine pores of the roughened surface.

By the term "hydrophilic resin" is meant a resin having some hydrophilic groups in the chemical structure thereof, such as —OH, —COOH, —COOCO—, —SO$_3$M (wherein M is a hydrogen atom or an alkali metal), —NH$_2$, —CONR$_1$R$_2$ (wherein each of R$_1$ and R$_2$ is a hydrogen atom or an alkyl group) etc. There are many examples as a hydrophilic resin, for example, gelatin, casein, cellulose acetate maleate, vinyl-maleic anhydride copolymer, polyvinylpyrrolidone, polyacrylate, polyacrylic acid, etc.

The concentration of the solution or dispersion of the hydrophilic resin solution may be varied at any desired level depending upon the type or polymerization degree of the resin used, for example, varying from 100 to 5,000. When gelatin is used as the hydrophilic resin, for instance, the concentration of gelatin in the aqueous solution may take any value within the range of 0.1–10 percent by weight based on the weight of the solution. It is prefered, however, to empoly a concentration of about 0.5–2 percent in practical use since too low concentration will result in poor adhesion and too high a concentration will cause excessive stickiness.

The dispersion of gelatin used is preferably prepared by admixing about 100 times the amount of gelatin of an organic solvent with a solution of gelatin in a nearly equal amount of water to thereby disperse the gelatin in the organic solvent. The organic solvents used include, for example, methanol, ethanol, acetone, methyl ethyl ketone, tetrahydrofuran, methylene chloride, ethylene chloride and mixtures thereof. However, the use of methanol among these solvents is especially desirable in view of the stability of the dispersion formed and the inertness to a number of polymers.

The ultrasonic waves applied in this invention have a frequency of above 17 KC, but a frequency ranging from 20 to 2,000 KC is especially preferred.

The ultrasonic vibration may be imparted, for instance, by placing an oscillating element directly in the liquid to be treated, or by placing the liquid to be treated in another vessel containing another liquid in which an oscillating element is placed to thereby apply indirect vibrations.

The contact of the support with the vibrating liquid may be effected by directly dipping the support in the liquid body. In the case of treating a sheet-like support, however, it may be coated with the liquid by a variety of coating methods known per se in the art. In general, it has been observed that the longer the contact time the greater is the effect of treatment.

Drying of the treated support may usually be conducted at room temperature in an air stream, but it may be conducted at an elevated temperature unless the state of the support itself is sensitive to elevated temperatures.

Since the support contains gelatin particles embedded or deposited inside the coarse surface by means of ultrasonic energy which increases the hydrophilic property of the support surface while improving the adhesiveness and affinity thereof, the roughened surface of the support preferably has a structure such that the fine pores of the surface layer are formed as deeply as possible and have a highly complicated pore structure like a sponge.

Moreover, we have found that a more effective improvement in adhesiveness can be attained by pretreating the roughened surface of the support, prior to immersion in the ultrasonically vibrating liquid, for instance, by coating thereon a surface active agent, by activating the surface with a corona discharge, or by ultra-violet ray irradiation and or ozone oxidation activation. The surface active agent includes any conventional anionic, cationic, nonionic and amphoteric types. We have also found that pretreatment such as corona discharge, ultra-violet ray irradiation, ozone oxidation etc., though they give only unsatisfactory effects when applied independently exhibit outstanding improvements in adhesiveness when they are combined with the ultrasonic energy treatment of the present invention. This phenomenon is believed to be caused by the fact that the receptivity or stability of the support is enhanced to a greater extent by such activating pretreatment at the instant when the hydrophilic resin particles or colloids are deposited onto fine protrusions or into the minute pores.

The method of the present invention finds wide industrial application, for instance, it is applied to the treatment of a photographic support made of plastic film having a roughened and whitened surface so as to ensure adhesion between a photographic emulsion and the support. In addition, the resultant photographic printing paper has excellent water resistance and superior dimensional stability to moisture of an extent never attained in conventional printing papers. By treating both sides of the film, it is possible to obtain a photographic material with good writing and drawing performance when written or drawn upon with pencil or ink.

The surface treatment method of this invention may also be applied to high molecular weight foams to thereby impart excellent stickiness or acceptivity to aqueous inks, paints and adhesives which therefore greatly facilitates the production and use of various articles including ornaments, building materials and toys.

The best mode of the present invention will now be illustrated in great detail by the following examples in which the treatment with ultrasonic waves was conducted employing a type UE-150-V-4A wide band ultrasonic wave oscillator manufactured by Cho-onpa Kogyo Co., Ltd. (Ultrasonic Wave Industry Co., Ltd.) at an output of 150 W and a frequency range of 20 – 2,000 KC. The material of the oscillating element used was composed of Ni, Fe or $BaTiO_3$, though this is of no importance to the invention.

EXAMPLE 1

A polycarbonate film of 0.2 mm thickness was dipped in dimethyl formamide for 3 seconds, then immersed in methanol for 30 seconds to thereby roughen and whiten the film surface. The thus roughened film was split into 4 strips identified as sample-1, 2, 3 and 4, respectively.

A dispersion of gelatin (hereinafter referred to as the undercoat liquid) was prepared according to the following recipe.

| | |
|---|---|
| Gelatin | 4 g |
| Water | 10 g |
| Methanol | 500 cc |
| Salicylic acid | 1.4 g |
| Formalin (20% aqueous soln.) | 1.5 cc |

The following treatments were carried out on each of the samples.

Sample 1: Not treated

Sample 2: Dipped in the above undercoat liquid at 50°C for 30 seconds followed by drying in an air stream at room temperature.

Sample 3: Dipped in the same undercoat liquid at 50°C. for 30 seconds while imparting ultrasonic vibration to the liquid using a Ni oscillator at 150W, 25KC and then dried in an air stream at room temperature.

Sample 4: Coated with a 0.1 percent aqueous solution containing the surface active agent

dried, then treated in the same manner as Sample-3 with ultrasonic waves in the undercoat liquid.

To each sample described a silver halide photographic emulsion was applied. The composition of the emulsion per square meter of the film was as follows:

| | |
|---|---|
| Silver chlorobromide | 3.5 g |
| Gelatin (binder) | 13.0 g |
| Formalin (hardener) | 0.1 g |
| Saponin (wetting agent for coating) | 0.03 g |

Water to make the entire solution to 130 cc.

For the sake of measuring the degree of adhesion between the sample film and the emulsion coating layer, a stripping test was carried out in the following manner and the results thereof are given in Table 1.

1. Stripping test in dry state.

A two-sided adhesive tape was attached to the emulsion layer side of the sample film. The other side of the tape was bonded to a cellulose triacetate film 0.14 mm in thickness, then cut into a rectangular strip 1 cm wide and 15 cm long. This strip was subjected to a T-shaped stripping test at a drawing speed of 7.35 cm/min. while measuring the strip strength by means of a strain gauge.

2. Stripping test in wet state

The cellulose triacetate film was bonded to the wet surface of the sample after development using a cyanoacrylate adhesive, and the stripping strength test was conducted in the same manner as shown in (1).

Table 1

| Sample No. | stripping resistance (g/mm) | |
|---|---|---|
| | in dry state | in wet state |
| 1 | 10 | 1 |
| 2 | 10 | 1 |
| 3 | 20 | 4 |
| 4 | 30 | 5 |

As seen from the results of Table 1, the sample treated with undercoat liquid under ultrasonic vibration exhibits a degree of adhesion 2–5 times greater than that of an untreated sample. The adhesion strength so obtained is satisfactory for that between the support and the emulsion layer of a photographic material.

EXAMPLE 2

A biaxially stretched polystyrene film of 0.2 mm thickness was dipped in a solvent mixture comprising 1 part acetone and 1 part methyl ethyl, ketone, then immersed in methanol for 30 minutes to give a whitened and opaque film having a number of minute pores on its surface. The film was slit into 5 strips, each of which was immersed in the undercoat liquid of Examples 1 at 50°C for 30 seconds while imparting ultrasonic vibration at varying frequencies (Samples 5–9). After drying the treated film in air at room temperature, it was coated with a silver halide color photographic emulsion having the following composition per squaremeter of the film.

| | |
|---|---|
| Silver chlorobromide | 3.0 g |
| Gelatin | 3.5 g |
| Emulsified dispersion containing benzoylaceto-2-chloro-5-dodecyloxy-carbonyl anilide (yellow coupler) | 14.0 g |
| Triethylene phosphamide (3% soln. in acetone) | 3.0 ml. |
| Polyvinyl pyrrolidone | 0.7 g |

The results of the stripping test of Example 1 as applied to the above films coated with the color emulsion are given in Table 2.

TABLE 2

| Sample No. | Frequency (KC) | Oscillator | Stripping strength (g/mm) | |
|---|---|---|---|---|
| | | | dry state | wet state |
| 5 | not applied | | 1 | 0 |
| 6 | 25 | Ni | 15 | 5 |
| 7 | 28 | Fe | 14 | 4 |
| 8 | 200 | BaTiO₃ | 17 | 6 |
| 9 | 1200 | BaTiO₃ | 15 | 5 |

As shown in Table 2, all the samples treated by ultrasonic vibration exhibited a remarkable increase in their adhesive strength which satisfies the requisite adhesion strength between the support and the emulsion layer of color photographic materials.

EXAMPLE 3

A polystyrene film roughened according to the method of Example 2 was coated with surface active agents having the following formulae (Samples 11–13)

Sample-11

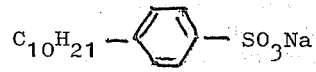

Sample-12   $C_{18}H_{35}CONCH_2CH_2SO_3Na$

Sample-13

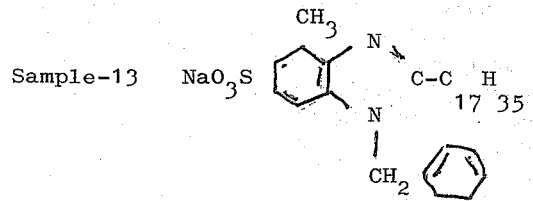

Each of Samples 11, 12 and 13 was immersed for 30 seconds in the undercoat liquid of Example 1 to which ultrasonic vibrations of 25KC at 150W were applied. The samples so treated were coated with a silver halide photographic emulsion of the same composition as in Example 1 at the same thickness. An untreated Sample 10 was also coated. All samples were subjected to the stripping test in the same manner as set forth in Example 1. The results are given in Table 3.

Table 3

| Sample No. | Stripping strength (g/mm) | |
|---|---|---|
| | dry state | wet state |
| 10 (untreated) | 2 | 0 |
| 11 | 10 | 4 |
| 12 | 11 | 5 |
| 13 | 14 | 6 |

As seen from the results of Table 3, the samples treated with the undercoat under ultrasonic vibration after pretreatment with the surface active agent showed a remarkable improvement in adhesive strength between the support and the silver halide emulsion layer.

EXAMPLE 4

A polystyrene sheet containing 22.5 percent by weight of powdery titanium dioxide was stretched in both the lateral and lengthwise directions at elongations of 1.5 times at 120°C, and then treated in the same manner as in Example 2 to form a roughened surface.

The thus roughened film was subjected to corona discharge then immersed for 30 seconds in a 1 percent aqueous gelatin solution to which ultrasonic vibration was applied (23KC at 150W), and thereafter dried in an air stream at room temperature. The resultant film was coated with the silver halide color photographic emulsion used in Example 2, and subjected to the stripping test in the same manner as described in Example 1. There was obtained an adhesive strength of 27g/mm in the dry state and 6g/mm in the wet state. On the other hand, a support was coated with the same emulsion without the undercoating treatment to give a product in which no adhesion between the support and the emulsion layer was effected.

EXAMPLE 5

A hard polyvinyl chloride film 0.2 mm thick was immersed in tetrahydrofuran for 10 seconds, then in methanol for 30 seconds to obtain a whitened and opaque film having a fine porous layer on its surface. The film, so obtained was immersed for 30 minutes in the undercoat liquid of Example 1 to which ultrasonic vibration in 25KC at 150 W was applied during immersion. After drying the thus treated film in an air stream, it was then coated with the silver halide emulsion of Example 1, and then subjected to the stripping test in the foregoing manner to give an adhesive strength of 10g/mm in the dry state and 4g/mm in the wet state which well satisfies that required for a practical photographic material. On the other hand, no adhesion between the support and emulsion layer was effected when the support was not treated with ultrasonic vibration.

EXAMPLE 6

A solution of 10 percent cellulose triacetate dissolved in a mixed solvent comprising 92 parts methylene chloride and 8 parts methanol was spread over a silver band blasted with 240 mesh sand paper, then dried to give a one-side matted film. The film so obtained was subjected to undercoating treatment under ultrasonic vibration in the same manner as in Example 5, then coated with the same silver halide photographic emulsion as used in Example 5. The stripping test of the coated film showed a stripping strength of 5g/mm in the dry state. On the other hand, no adhesion to the silver halide photographic emulsion was effected when the undercoat liquid was applied without ultrasonic vibration to the mat film, nor when the ultrasonic vibrating undercoat treatment was effected to a smooth cellulose triacetate film.

EXAMPLE 7

A roughened polystyrene film was obtained as in Example 2. The film was coated under ultrasonic vibration (25KC at 150W) with the undercoat liquid having the following composition:

| | |
|---|---|
| Maleic anhydride  Vinyl acetate copolymer | (1:1 in molar ratio) 25 g |
| Methanol | 500 cc |
| Acetone | 10 cc |
| n-Butanol | 50 cc |
| Chromium acetate | 25 g |

The resultant film was coated with the silver halide phtographic emulsion of Example 1 to give an emulsion layered film having a stripping strength in the dry state of 13 g/mm and in the wet state of 4g/mm. On the other hand, no appreciable adhesion was obtained when the treatment was applied without imparting ultrasonic vibrations.

EXAMPLE 8

A roughened polystyrene film was immersed at 50°C for 20 seconds in the undercoat liquid of Example 1, to which ultrasonic vibrations at frequencies of 25, 200 and 1200KC were applied, and thereafter an ink-holding test was carried out with an aqueous ink according to the following two methods.

1. Test for ink-retaining strength after water-washing

The above film was coated with an aqueous blue black ink (produced by Pilot Ink Co.) by spreading with a writing brush, dried at 50°C for 10 minutes, then immersed in water at 20°C for one minute. The density of ink remaining on the paper was measured using a diffusion penetration density meter (manufactured by Macbeth Instrument Co., Ltd. "Transmission Densitometer model TD-102").

2. Test for ink-retaining strength at dry state

In a manner similar to (1), the ink was applied, dried at 50°C for 10 minutes, then attached to a pressure sensitive adhesive tape (Nitto Plastic Tape No. 31) and the density of ink remaining was measured by using the same meter after stripping off the tape at 2 cm/second.

The results of measurements by methods (1) and (2) are given in Table 4 below:

Table 4

| Sample No. | Frequencies (KC) | Density of ink attached after washing with water (1*/2**) | Density of ink after stripping off the adhesive tape at dry state (1*/2**) |
|---|---|---|---|
| 14 | Untreated | 0.18 | 0.32 |
| 15 | 25 | 0.50 | 0.80 |
| 16 | 200 | 0.45 | 0.75 |
| 17 | 1200 | 0.52 | 0.60 |

1* transmission light
2** incidence light

As shown in Table 4, the synthetic paper treated with ultrasonic vibrations has an excellent ink-retaining property as compared to the untreated film.

EXAMPLE 9

A foamed polystyrene sheet 1 mm thick (manufactured by Japan Styrene Paper Co., Ltd.) was undercoated under ultrasonic vibration using the procedure of Example 5. Two sheets of the treated polystyrene sheet were bonded together using an epoxy-type adhesive (Alardite-R), heat-treated at 50°C for 4½ hours, then split into rectangular strips 1 cm wide and 15 cm long. The strips were peeled from each other at draw speed of 7.38cm/min. showing a stripping strength of 10 g/.mm. On the other hand, a polystyrene foam sheet which has not been subjected to the undercoat treatment with ultrasonic vibration had an adhesive strength of 2g/mm.

What is claimed is:

1. A method of improving the surface of a hydrophobic high molecular weight resinous support having a roughened surface which comprises contacting the surface with a liquid in which a hydrophilic resin is dissolved or dispersed while subjecting said liquid to ultrasonic vibrations.

2. A method as claimed in claim 1, wherein said support is of polystyrene, polycarbonate, cellulose triacetate, polyvinyl chloride, polyester, polyamide, polyolefin or polyacetal.

3. A method as claimed in claim 2 wherein the average degree of polymerization of said support is from 100 to 5000.

4. A method as claimed in claim 1, wherein said liquid is water or an organic solvent.

5. A method as claimed in claim 1, wherein said hydrophilic resin is gelatin.

6. A method as claimed in claim 5 wherein the concentration of resin in said liquid is from 0.1 to 10 weight percent.

7. A method as claimed in claim 1 wherein the frequency of said ultrasonic vibration is greater than 17 K.

8. A method as claimed in claim 7 wherein the frequency of said ultrasonic vibration is 20 to 2000 K.

9. A method of improving the surface of a hydrophobic high molecular weight resinous support comprising roughening the surface of said support to produce fine pores thereon, and contacting said roughened surface with a liquid having a hydrophilic resin dissolved or dispersed therein while subjecting said liquid to ultrasonic vibration.

10. A method as claimed in claim 9 further comprising activating said roughened surface prior to contacting the surface with said liquid.

11. A method as claimed in claim 9 wherein the pores produced by said roughening have an average diameter of from 0.1 to 100 microns and an average depth in excess of 0.1 micron.

12. A method as claimed in claim 9, wherein said support is a film for supporting a photographic coating layer.

13. A method as claimed in claim 12, wherein said photographic coating layer contains gelatin as a binder.

14. A method as claimed in claim 10, wherein said activating is with corona discharge.

15. A method as claimed in claim 10, wherein said activating is by ultra-violet ray irradiation.

16. A method as claimed in claim 10, wherein said activating is by ozone oxidation activation.

* * * * *